Aug. 22, 1944.  W. B. FERGUSON  2,356,454

METHOD AND APPARATUS FOR FLUOROGRAPHY

Filed Oct. 30, 1941

INVENTOR.
William Boyd Ferguson
BY
ATTORNEY

Patented Aug. 22, 1944

2,356,454

UNITED STATES PATENT OFFICE 2,356,454

METHOD AND APPARATUS FOR FLUOROGRAPHY

William B. Ferguson, Brenham, Tex.

Application October 30, 1941, Serial No. 417,092

9 Claims. (Cl. 250—71)

The present invention relates to the measurement of the luminescent properties of materials. Many substances, if irradiated by radiation of one quality, possess the power of emitting radiation of a different quality. In many instances, the intensity of the emitted radiation is quantitatively related to the concentration of the substance in question and the intensity of the incident radiation. In such cases, it is possible to determine the concentration of the substance by a comparison of the intensities of the incident and emitted radiation. A familiar example of this luminescence technique is that of fluorescence. When various materials are placed in ultra-violet light they emit visible light. This technique has been widely studied and has been found to have very valuable possibilities. In other cases, however, other varieties of luminescence are more useful and accordingly a different quality of exciting radiation is employed and some particular quality of emitted radiation is measured.

The present invention provides means for automatically eliminating the effects which have previously rendered the use of luminescent technique unsatisfactory. As will be seen later, the previous methods of applying this technique involve problems of such difficulty that, in spite of its manifest advantages, it has up to the present time been employed on a comparatively limited scale and its use largely confined to qualitative determinations.

The present invention provides a rapid and accurate method which reduces luminescent technique to a routine procedure that can be carried out by an operator of moderate skill and with simple equipment with the assurance of obtaining precise results. In contrast, the methods in use up to the present time have been either very laborious, quite inaccurate, or both. Unless elaborate equipment was employed by skilled operators, the accuracy of these methods was quite low.

A major factor contributing to this inaccuracy is the instability of the necessary sources of ultra-violet or other radiation. As is well known, small variations in the voltage supplied such sources result in large variations in intensity. Moreover, the measuring equipment necessary in the former methods was of necessity of high sensitivity and required accurate adjustment and frequent calibration so that it was impractical to maintain the radiation intensity and the sensitivity of the measuring equipment uniform over the time required for making an extended series of measurements. The technique of the present invention eliminates both of these difficulties.

An object of the present invention is the provision of a cheap, simple and effective method for prospecting for oil, either by surveying a borehole or the surface. In the first procedure, commonly known as well-logging, samples of cuttings are collected at spaced depths. These cuttings are photographed under ultra-violet light and the density of the image on the negative so produced is measured. The density of each sample may be compared to that of a standard. The samples may be photographed separately, but for most comparable results it is preferred to photograph a large number of samples simultaneously. In fact, all of the samples for the whole well may be photographed at one time, and in this way variation in the power of the source of ultra-violet light need not be taken into account. In an important modification the samples are photographed separately under ultra-violet light and under visible light, ultra-violet light being filtered out between the samples and the film in each case, and the differences between the densities of the images under visible light and ultra-violet light respectively, as measured by a densitometer, relied upon as the significant figures.

In surface prospecting the soil samples are usually collected at spaced points over an area to be surveyed; the points being so selected as to form a comprehensive and preferably symmetrical pattern over the area. These samples may be collected at various depths, ranging from a few inches below the surface to several feet, such as five, twelve and twenty. The latter depth constitutes a practical upper limit for economical operation, but greater depths may be employed if desired. It is preferred to collect all the samples in a given area at a uniform depth. Ordinarily these samples are collected in small jars or containers and shipped to the laboratory for inspection. Since, in the practice of the present method as applied either to well logging or surface prospecting, only a small portion of soil, such as about one or two grams, is used for examination, the sample from which the portion is taken should be thoroughly mixed so that the portion observed will be representative.

As pointed out above, when the method is applied to oil prospecting it is desirable to photograph the samples separately under ultra-violet light and white visible light, respectively. Ordinarily there is included among the samples a blank, which is preferably a sample of soil or other material known to be non-fluorescent. It is preferred to select for this blank a soil or substance which has a color under visible light between white and black, lighter than any of the soil samples undergoing inspection. Thus, the image of this blank under visible light will be darker or more dense than any of the images of the other samples. If, when the samples are photographed under ultra-violet light, the exposure time is such as to give an image of the blank of the same density as that obtained under the visible light it becomes a simple matter to detect by comparison of the two pictures those samples which fluoresced under ultra-violet light, because they will inevitably give images under the ultra-violet light which are darker or more dense than the images which they gave under visible light. This is necessarily true only when the exposure time under ultra-violet light is so adjusted that the blank gives the same image as it gives under visible light. Usually, this means that the exposure time under ultra-violet light will be several hundred times the exposure time under visible light.

While a method of making accurate quantitative measurements has been described above, it will be understood that for prospecting purposes such precision is not always necessary. In a given area, for example, anomalies may be detected merely by comparing the densities of the images of the several samples. Frequently a visual inspection is sufficient to permit identification of the samples having anomalously high densities. It will be understood that in all cases the samples are identified by numbers or otherwise, so that the densities may be correlated with the sample locations on a map of the area surveyed, or a log of the borehole surveyed.

In one embodiment the present invention consists in exposing a multiplicity of samples simultaneously to the exciting radiation, recording the luminescence photographically, and measuring the densities of the resulting images on the negative.

The nature and further objects of the present invention will be understood more fully from the following detailed description of the accompanying drawing, in which—

Figure 1:
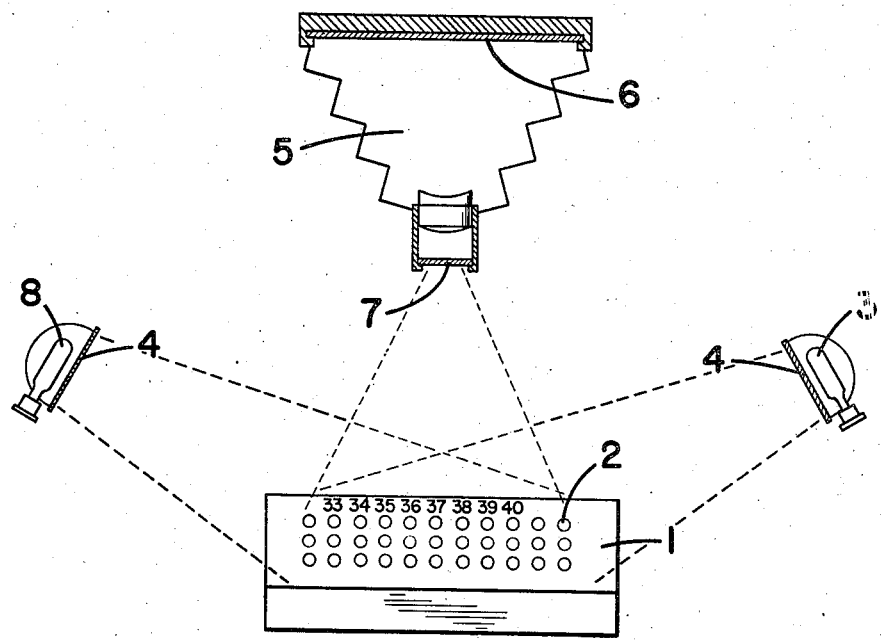
Figure 1 is a diagrammatic representation of one preferred embodiment of the present invention and shows the apparatus and arrangement thereof.

Figure 1 shows a form of the apparatus which, experience has shown, gives satisfactory results. In this figure numeral 1 designates a tray for holding the samples. Numeral 2 represents an individual cell for holding a single sample. Adjacent each cell on the surface of the tray is a number, as shown. This number identifies the sample and is preferably made by marking the surface with material which will photograph sharply under ultra-violet as well as under visible light. Numeral 3 represents a source of ultra-violet radiation. Numeral 4 represents a filter which passes a portion of the ultra-violet light from the source 3 but absorbs the visible light from the source 3. In practice, a second source represented by numeral 8 is desirable in order to make the distribution of the ultra-violet radiation on the samples in tray 1 uniform. When the ultra-violet light strikes the samples in the various cells 2, they fluoresce and emit visible light. By means of a camera 5 a photographic record of this fluorescence is made upon the sensitive plate 6. A filter 7 is placed in front of the camera 5. This filter absorbs any ultra-violet light which is reflected from the samples and transmits a portion of the visible light due to fluorescence.

For apparatus such as described and employing two General Electric S4 lamps as sources, 3 and 8, Wratten 18A filters 4, Wratten 2A filter for filter 7 and a high speed panchromatic film for film 6, and with the lamps 20 inches from the center of the tray 1, an exposure of the order of two hours with a lens aperture of f:4.5 is satisfactory for typical soil samples or well cuttings. The exposure time is chosen with relation to the intensities in such a way that the densities lie on the substantially straight portion of the characteristic curve of the film employed.

Figure 2:
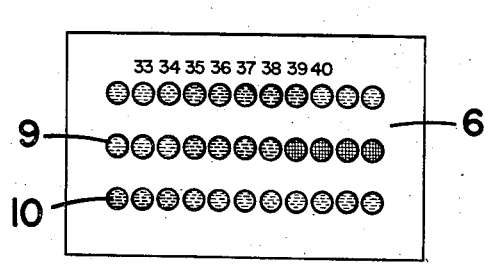
Figure 2 is a representation of a typical record obtained by the use of the present invention.

Figure 2 represents a typical photographic record obtained by the use of the present invention. Numerals 9 and 10 represent typical records for individual samples. Numeral 6 represents the film after exposure and processing. The processing of the film is carried out in the normal manner. By the familiar time-temperature method of development the film is developed to a standard gamma. This gamma value is not critical, but where a number of films are to be prepared, the gamma of each should be substantially the same. A value of 1 is satisfactory.

From the above description, it will be apparent that the effects of variations of radiation intensity, which are so difficult to avoid and which cause the errors that have rendered the prior methods inaccurate or tedious, are eliminated by the present invention. Since all of the samples in the tray are exposed simultaneously, variations in the intensity of the exciting radiation affect all of them in the same way, so that it is unnecessary to maintain the intensity constant. Likewise, the photographic records for all of the samples in the tray are processed simultaneously. Consequently, the measurement is reduced to the use of a densitometer. The range of densities is great enough so that the standard commercial densitometers may be employed and readings may be checked with an extremely high degree of accuracy. If an absolute measurement of the concentration of the luminescing materials is required, the samples may include specimens of known concentrations. These specimens should include the full range of concentrations to be expected. However, in many applications only relative measurements are necessary, in which case the comparison specimens may be omitted.

If the number of samples to be tested exceeds the number of cells in the tray no difficulty is introduced. One need only include a few samples on each tray which were among those on the preceding tray. By the familiar time-temperature method of development, the photographic contrast, or gamma, of the various records is readily kept substantially constant. Variations in the intensity of the radiation will result only in a change in the exposure. However, if the densities fall on the substantially straight portion of the characteristic curve of the film used, any variation in the intensity of the illumination will result in adding or subtracting a constant amount of density to each point on the record so that by adding or subtracting a constant correction all densities are reduced to the proper value. The value of this correction is, of course, the difference between the densities on the two records of the repeat samples.

Figure 3:
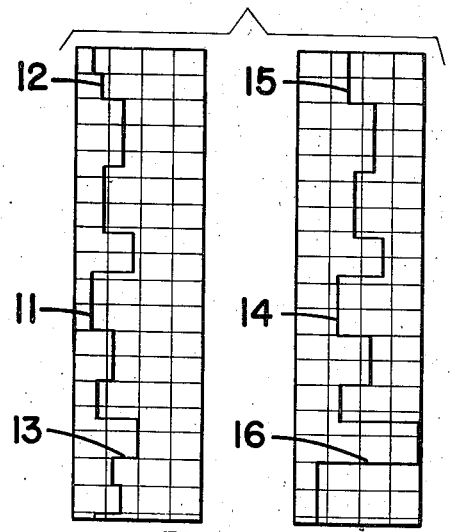
Figure 3 represents well-logs obtained in two wells by the use of the present invention.

Figure 3 represents two charts on which there have been plotted, as ordinates, the depth, below the surface of a drilling well, from which samples were obtained and, as abscissae, the densities of the images such as 9 and 10 produced by the samples. Numeral 11 represents a chart from a non-productive well. Numeral 12 represents the results for a sample obtained near the surface. Numeral 13 represents the results of a sample obtained near the bottom of the well. Numeral 14 represents a chart from a nearby productive well. Numeral 15 represents the results from a sample near the surface and numeral 16 represents the results from a sample near the bottom of the well. Referring to chart 14, it will be noticed that the sample at the depth indicated by numeral 16 was much more fluorescent than any of the other samples. This indicates that this sample contained a high concentration of petroleum. This particular formation proved to be productive in this well. By contrast, the fluorescence of the sample at the depth indicated by numeral 13 taken from the corresponding stratum in a nearby well has a very much lower fluorescence. This corresponds to the fact that this well was non-productive. A very interesting feature can be seen by comparing the results obtained with the shallow samples in the two wells and shown at 12 and 15. In the case of the first, non-productive, well, a comparatively low value of fluorescence is obtained, whereas, in the case of the second, productive, well, a comparatively high value of fluorescence is obtained. Similar results can be obtained by employing samples of the drilling mud rather than samples of the formations.

Figure 4:
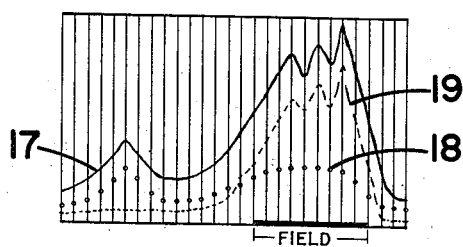
Figure 4 shows a profile typical of those obtained when the present technique is applied to surface prospecting.

Figure 4 shows the application of this invention to prospecting. Three charts, numbers 17, 18 and 19 have been plotted showing the results obtained by applying this method to samples of soil collected near the surface along a road which crosses an oil field. In these charts, distances along the road have been plotted as abscissae and in chart 17, the densities of the corresponding images of the samples when exposed in the apparatus of Figure 1 to ultra-violet light have been plotted as ordinates. In the chart 18, the ordinates are the values of density obtained by exposing the samples in the apparatus of Figure 1 with visible or white light sources, rather than ultra-violet sources, at 3 and 8 and with the filters 4 removed. A much shorter exposure time is employed; for example, one second at f:22. The exposure is chosen so that the densities of the resulting images fall on the substantially straight portion of the characteristic curve of the film used. It will be observed that except along the portion of the road crossing the field, charts 17 and 18 are roughly parallel but that for the samples on the field, the two charts are widely divergent. This condition has been found to be quite common in practice. It is therefore helpful, in some cases, to plot a third chart such as 19 in which the ordinates are the differences in the values of the ordinates of charts 17 and 18. This chart displays the anomalous densities on the field in a somewhat more striking manner than does the original chart 17. This same technique of modifying the charts may also be employed in making well-logs such as those of Figure 3.

It has already been pointed out that when the samples are photographed separately under ultra-violet and visible light respectively, it is desirable to include in the samples a blank, and to adjust the relative exposure times under the two types of light so that the blank gives an image of the same density in each case. When the exposure times are not so adjusted the blank will give an image of different density under visible light than that obtained under ultra-violet light. This difference may be used as a correction factor and added to the difference in density under visible and ultra-violet light, respectively, for each sample. By this procedure the samples which exhibit the most fluorescence under ultra-violet light are brought into bold relief on the resulting chart, log or map.

While the discussion of the illustrative Figures 1, 2, 3 and 4 has been confined to visible fluorescence produced by ultra-violet light, the applicability of this invention is far wider. Many materials exhibit the phenomenon of luminescence, that is, when radiations of one quality strike the material it emits radiation of a different quality. The ultra-violet fluorescence is only one of the many examples of this property. It is, however, a very important example. Minute quantities of a fluorescent material are sufficient to produce measurable amounts of light. Moreover, the intensity of the visible light is quantitatively related to the amount of material present and to the intensity of the ultra-violet radiation. This makes possible a quantitative determination of small quantities of material either directly or by converting it into a material which will fluoresce. The other types of luminescence may also be utilized in this same manner.

A modification of this invention is used when the color of the emitted light is diagnostic. In this modification, photographic records are made with two or more filter and film combinations having different spectral responses. In many cases these responses should approximate the standard ICI color mixture curves so that the results give the tricolor stimuli for the emitted light. The familiar one shot color cameras, employing half-silvered mirrors, may be used to obtain the exposures simultaneously on separate films, or bipack or tripack films, such as Kodachrome, may be used in an ordinary camera such as illustrated in Figure 1.

The nature and objects of the present invention having been thus described and illustrated, what is claimed as new and useful and is desired to be secured by Letters Patent is:

1. A method for measuring the fluorescence of a body under ultra-violet light which comprises photographing the body separately under ultra-violet light and under visible light while employing exposure times under the different lights such that the body, if non-fluorescent, would give an image of the same density under the ultra-violet light as that obtained under the visible light, and comparing the densities of the resulting images on the photographic film.

2. A method of prospecting for oil which comprises collecting spaced samples of soil in the area to be surveyed, photographing the samples under ultra-violet light to produce images on a negative photographic film, photographing the samples under visible light to produce a separate set of images on a negative photographic film, and comparing the densities of the images of individual samples produced under the different types of light.

3. A method of prospecting for oil which comprises collecting a plurality of spaced samples of soil in the area to be surveyed, photographing a multiplicity of said samples simultaneously under ultra-violet light, separately photographing said multiplicity of samples under visible light whereby two sets of images on photographic film are produced, measuring the relative densities of images of individual samples under the two types of light, and utilizing said density measurements in determining the presence or absence of oil in the area explored.

4. A method for prospecting for oil which comprises collecting a plurality of spaced samples of soil in an area to be explored, arranging a multiplicity of said samples adjacent each other on a tray, arranging adjacent said samples a sample of soil known to be non-fluorescent under ultra-violet light, photographing the entire assembly under ultra-violet light to produce a plurality of images on the photographic negative, separately photographing the assembly under visible light to produce a separate set of images on the photographic negative, determining the difference in density of the respective images of each individual sample, determining the difference in density of the respective images of the non-fluorescing sample, adding said latter difference to the difference in the said two densities of each sample and utilizing the resulting data in determining the presence or absence of oil in the area explored.

5. A method for exploring for oil which comprises collecting a plurality of spaced samples of soil in an area to be surveyed, arranging a multiplicity of said samples adjacent each other on a tray, including in said assembly a sample of soil known to be non-fluorescent under ultra-violet light, photographing the entire assembly under visible light to produce a plurality of images on a photographic negative, separately photographing the assembly under ultra-violet light, while excluding the ultra-violet light from the photographic negative and utilizing an exposure time such that the resulting image of the non-fluorescing sample on the photographic negative will have the same density as the corresponding image produced under visible light, to thereby produce a separate set of images on the photographic negative, determining the difference in the densities of the images of individual samples under visible light and under ultraviolet light respectively, and utilizing the resulting data in determining the presence or absence of oil in the area explored.

6. A method according to claim 2 in which the soil samples are collected at different depths in a borehole drilled for oil.

7. A method according to claim 2 in which the soil samples are collected at substantially the same depth at laterally spaced points over the area to be explored.

8. A method for prospecting for oil which comprises collecting a plurality of spaced samples of soil in the area to be surveyed, subjecting said samples to ultraviolet light, transmitting any resulting fluorescence from said samples to a negative photographic film while excluding ultraviolet light from said film, and comparing the densities of the images thus produced on said negative.

9. A method for prospecting for oil which comprises collecting a plurality of spaced samples of soil in the area to be surveyed, subjecting a multiplicity of said samples simultaneously to the action of ultraviolet light, transmitting the resulting fluorescence from said samples to a negative photographic film to thereby produce a multiplicity of images on said film while excluding ultraviolet light from said film, and comparing the relative densities of said images.

WILLIAM R. FERGUSON.